United States Patent

[11] 3,578,830

[72] Inventor Alfred Pitner
 Paris, France
[21] Appl. No. 853,075
[22] Filed Aug. 26, 1969
[45] Patented May 18, 1971
[73] Assignee Rueil Nadella
 Malmaison, France
 fractional part interest
[32] Priority Aug. 30, 1968
[33] France
[31] 164,658

[54] NEEDLE BEARINGS
 9 Claims, 6 Drawing Figs.
[52] U.S. Cl. .................................................... 308/207
[51] Int. Cl. .................................................... F16c 35/06
[50] Field of Search .......................................... 308/207,
 189, 184

[56] References Cited
UNITED STATES PATENTS
748,825 1/1904 Webb ........................... 308/207

*Primary Examiner*—Frederick L. Matteson
*Assistant Examiner*—Frank Susko
*Attorney*—Robert E. Burns ABSTRACT: A needle bearing in which the space for circulation of the needles between the two races is reduced in a plurality of angularly spaced zones around the bearing. To this end the ring forming one of the races is radially deformed in one direction in the region of each of the zones and is supported by an auxiliary resilient member, either the ring or the auxiliary member or both having a variable peripheral profile so that when subjected to axial compression, radial deformation is obtained both of the auxiliary member and the ring in accordance with the peripheral variations to thereby give raised appearance in the zones around the bearing. Furthermore the axial compression of the auxiliary member is adjustable during manufacture to produce a desired radial deformation and this axial compression is subjected into the bearing to maintain this radial deformation permanently during the life of the bearing.

PATENTED MAY 18 1971 3,578,830
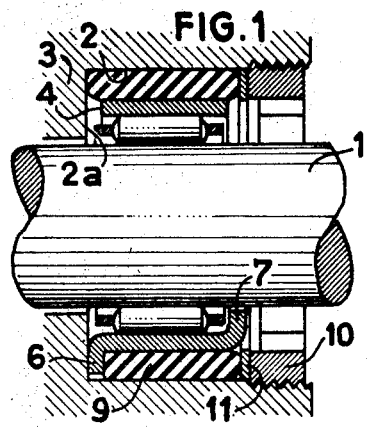
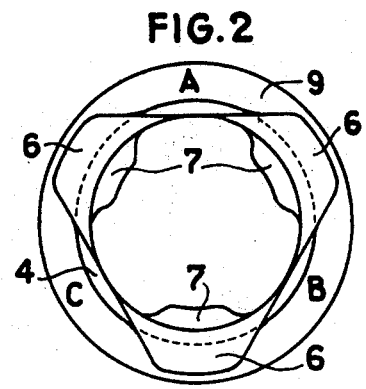
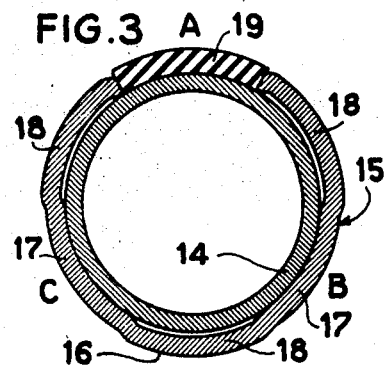
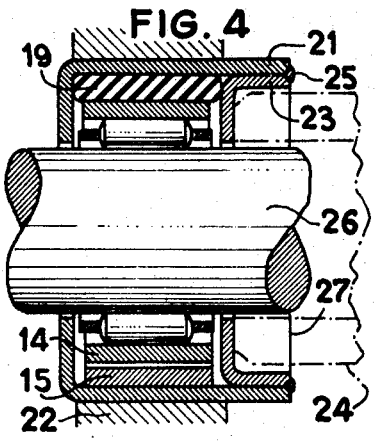
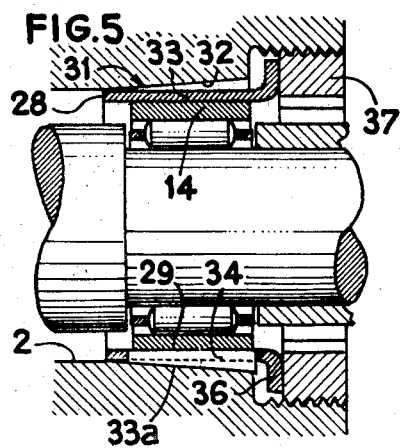
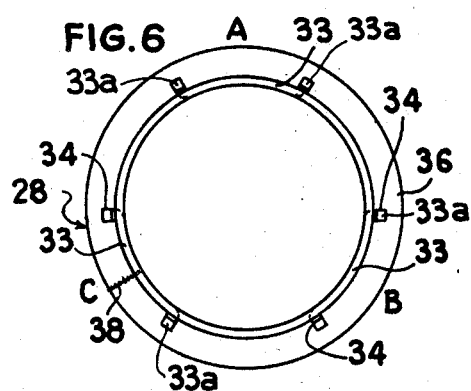

NEEDLE BEARINGS

This invention relates to needle bearings and in particular to a needle bearing in which the clearance obtained for the circulation of the needles between the two raceways is locally reduced in several angularly distributed zones. This may be obtained either by a suitable shaping of one of the raceways or by a deformation of the ring carrying this raceway obtained by exerting pressure on the corresponding zones on the surface of the ring opposed to the raceway or on the housing or seating which accommodates this ring as is known from U.S. Pat. No. 2,983,560.

The production of such a device with one or more resilient supporting points, so as to provide zero clearance or a slight prestrain, is also known from U.S. Pat. No. 3,009,748, the initial prestrain or that arising from possible expansions being limited by the characteristics of the resilient device used.

Instead of a thick ring, as in the prior technique it has been proposed in British Pat. No. 1,204,156 to use a thin ring for such bearings which ring is obtained by shaping, without removal of metal, a metal sheet having a thickness appreciably less than the diameter of the needles and to provide in the ring, zones, radially deformed in one direction, which are supported by a resilient auxiliary part whose elasticity is such that the needles are able in passing to radially resiliently deform said zones in the opposite sense whereby the stresses to which the needles are subjected remain low. By exerting a radial constraint on the undeformed zones, the elasticity of the ring as a whole also enables the deformed zones to be temporarily separated or spread out and thus to accommodate without prestrain, a shaft inside the bearing or the bearing inside a bore.

It is an object of the present invention to provide an improvement in this known device.

According to the present invention there is provided a needle bearing of the type in which the space provided for circulation of the needles between the two races is locally reduced in a plurality of angularly spaced zones by radially deforming in one direction the ring forming one of the races and supporting the deformed zones of the ring by an auxiliary resilient member, the passage of the needles past these zones resulting in an elastic deformation thereof opposite to said one direction, wherein either the ring or the auxiliary member or both has a variable peripheral profile so that when it is subjected to axial compression, radial deformation is obtained which varies therearound in accordance with the peripheral variations to thereby give a reduced clearance in the desired zones and means are provided including a thrust member acting axially on the auxiliary member, to maintain the axial compression of the auxiliary member corresponding to a determined radial deformation.

The peripheral profile of the ring may be made variable either by a variation in thickness of the cylindrical body of the ring or forming the ring with alternate purely cylindrical ring segments and intermediate segments provided with radial flanges which locally increase the rigidity of the ring, so that the radial deformations in the zones between the segments provided with flanges are greater than in the pure ring segments. In this case, the radial deformation can be produced by providing as the auxiliary member a resiliently deformable collar interposed between the cylindrical surface of the ring and the cylindrical surface on which the bearing is mounted and by subjecting this band to an axial deformation for example by means of a threaded ring engaged in a bearing part or mounting for the bearing.

When the variation in the peripheral profile is provided in the auxiliary member the ring having a constant cylindrical profile, this variation may be obtained, for example, by providing a two-part construction for this part, for example by making the auxiliary member in two segments, namely a metal segment having alternate zones which engage on the ring and zones radially spaced from the ring and a segment of resiliently deformable material to which an axial thrust may be applied in order to produce radial deformation of the auxiliary member and in turn radial deformation of the bearing ring.

The thrust member, in order to bring about the radial deformation, may be incorporated in the bearing, in the form of a threaded ring already mentioned, in which case it is possible to adjust the clearance of the bearing.

It is also possible for the bearing to be preadjusted, that is for the degree of radial deformation of the ring to be determined once and for all when the bearing is assembled. In this case the thrust may be created by a press which exerts its action on a supporting member in axial contact with the resiliently deformable collar or the segment of resiliently deformable material, forming part of the auxiliary member, which is then contained radially from the side opposite the bearing ring by a sleeve to which the supporting member is connected after the desired radial deformation has been produced, this sleeve being thus incorporated irreversibly in the bearing.

The invention will now be described by way of example with reference to the accompanying drawings, in which:

FIG. 1 is an axial section of a needle bearing constructed as an embodiment of the invention, FIG. 2 is a view of one end of the bearing ring and of the auxiliary part shown in FIG. 1, FIG. 3 is a radial section of a purely cylindrical ring encircled by an auxiliary part with a variable peripheral profile, FIG. 4 is a view showing a method of obtaining preadjustment of radial clearance in a bearing, FIG. 5 represents a bearing comprising an auxiliary part with a variable peripheral profile, entirely of metal, FIG. 6 is an end view of the auxiliary part used in the assembly of FIG. 5, viewed from left to right in this FIG.

FIG. 1 illustrates a bearing with adjustable radial clearance between a shaft 1 and the bore 2 of a frame 3. In particular, the bearing provides for the reduction of radial clearance to a predetermined value in three zones A, B, C, spaced around the periphery of the bearing. For this purpose, the bearing ring of thin metal 4 is purely cylindrical in shape within the zones A, B, C, but in between the each adjacent two zones A, B, C, the ring includes at one end an outwardly directed radial flange 6 and at the other end an inwardly directed radial flange 7. A continuous collar of elastomer 9 is interposed between the external cylindrical surface of the ring 4 and the bore 2 and is axially sandwiched between, at one end the radial flanges 6 or a radial face 2a of the bore and at the other end a washer 11 axially located by a threaded ring 10 screwed into the bore 2.

It will be seen that the axial compression exerted by the threaded ring 10 on the ring of elastomer 9 appears as a radial deformation of the ring 9 which effects an inward radial deformation of the bearing ring 4 and this occurs to a greater extent in the zones A, B, C where the ring has lower rigidity.

In FIG. 3, the ring 14 of the bearing is purely cylindrical and has a constant radial thickness. The localized deformation in the zones A, B, C is produced by means of an auxiliary part 15 encircling the ring 14 and composed of two pieces. One of the two pieces 16 is of metal with an arcuate extent of about 300°, having alternate segments 17 and 18 in contact with the outer periphery of the ring 14 at the positions B and C, the segments 18 being radially spaced from the ring 14. The other of the two pieces 19 comprises a segment of about 60° arcuate extent which makes contact with the ring 14 at the position A and is formed from elastic material similar to the material of the ring of elastomer 9 of FIG. 1.

In an assembled device using the preassembly of FIG. 3, the band segment 19, of elastomeric material, is as in FIG. 1 subjected to the action of a threaded thrust ring 10, the effect of which is to axially compress the segment 19 which results in a radial compression of the segments 17 of the part 15 and therefore the part 19 so as to reduce the clearance at the positions A, B, C of the bearing.

In the embodiment shown in FIG. 4, the part assembly of FIG. 3 is shown, employed in a bearing with preadjusted clearance. In this example, the preassembly 14, 15 of FIG. 3 is contained in an outer sleeve 21 placed in an accurately formed bore of a rigid ring 22 which forms part of the equipment for assembling the bearing. The elastic segment 19 is axially compressed through the intermediary of the pistonlike member 23 slidable in the bore of the sleeve 21, and acted on by the thrust mandrel 24 of a press (not shown). The assembling equipment is completed by a cylindrical gauge 26 placed inside the ring of needles. The press is operated and when the axial compression which gives the desired radial deformation of the positions A, B, C is reached, the sleeve 21 and the supporting part 27 are joined together, for example by welding 25. In this way a predetermined radial deformation may be applied to the bearing.

In the adjustable clearance bearing of FIG. 5, the bearing ring 14 is also cylindrical and the auxiliary part 28 is constituted by a band having an interior cylindrical surface 29 in contact with the ring 14 and the outer surface 31 of which has a general conical or tapered form corresponding to the tapered form 32 of a bore 2 receiving the bearing. The peripheral development of the auxiliary part 28 comprises alternately solid segments 33 provided at the positions A, B, C, and intermediate hollow segments 34. In order to give the solid segments 33 a certain radial elasticity, their edges are bent radially outwards at 33a so that the auxiliary part engages the conical surface of the bore 2 only along the edges 33a. The part auxiliary 28 also includes a radial flange 36 against which a threaded thrust ring 37 engages.

It is clear that when an axial thrust is exerted on the flange 36 by tightening the threaded ring 37 the greatest radial deformation of the ring is produced at right angles to the solid segments 33.

The auxiliary part 28 is advantageously made by rolling a punched-out blank and welding the adjoining edges 38 thereof.

By use of the means described in U.S. Pat. Nos. 2,928,702 and 3,004,323 the deformation of the bearing ring at the positions A, B, C, can be made variable axially so that the corresponding raceway is convex.

I claim:

1. A needle bearing comprising in combination inner and outer rings forming inner and outer races, a ring of needles between the two races, radially directed deformations in one direction in one of the rings and an auxiliary resilient member supporting the deformed zones of the ring having radially directed deformations therein, the passage of the needles past these zones resulting in an elastic deformation thereof opposite to said one direction wherein one at least of the two parts constituted by the ring having radially directed deformations and the auxiliary member has a variable peripheral profile so that when it is subjected to axial compression, radial deformation is obtained which varies therearound in accordance with the peripheral variations to thereby give a reduced clearance between the two races in the zones of the bearing containing the radial deformations and means are provided including a thrust member acting axially on the auxiliary member to maintain the axial compression of the auxiliary member corresponding to a determined radial deformation.

2. A bearing as set forth in claim 1 wherein the peripheral profile of the ring is varied by a variation in thickness of the cylindrical body of the ring.

3. A bearing as set forth in claim 1 wherein the ring having radially directed deformations is generally cylindrical and alternate segments of the ring are formed with radial end flanges which locally increase the rigidity of the ring so that the radial deformations between the segments having the flanges are greater than in these segments not having radial flanges.

4. A bearing as set forth in claim 1 wherein the auxiliary member comprises a continuous collar of resiliently deformable material.

5. A bearing as set forth in claim 4 further comprising a threaded ring screwed into a bearing part or into the bearing mounting and comprising said thrust member.

6. A bearing as set forth in claim 1 in which the auxiliary member is formed from two parts and comprises a metal segment having alternate zones which engage the ring and zones radially spaced from the ring and a segment of resiliently deformable material to which an axial thrust may be applied in order to produce radial deformation of the auxiliary member and in at least radial deformation of the bearing ring.

7. A bearing as set forth in claim 6 further comprising a press, a thrust member forming part of the press for applying said axial thrust to the auxiliary member, a support member through which said axial thrust is applied to said auxiliary member and means fixing the support member in a position giving the desired radial deformation of the bearing ring, during manufacture.

8. A bearing as set forth in claim 7 further comprising a sleeve containing the auxiliary member and means adjoining the sleeve to the support member in the position providing the desired radial deformation of the bearing ring.

9. A bearing as set forth in claim 1 wherein the auxiliary member comprises a collar, a first cylindrical surface on the collar in contact with the ring and a second generally conical surface on the collar, means to receive the bearing including a conical bore to receive the conical surface of the collar, said collar comprising alternate solid and hollow segments the elasticity of the solid segments being obtained by radially bending the edges of the segments and supporting the member in the bore by means of the bent upward flanges only.

UNITED STATES PATENT OFFICE
CERTIFICATE OF CORRECTION

Patent No. 3,578,830    Dated May 18, 1971

Inventor(s) ALFRED PITNER

It is certified that error appears in the above-identified patent
and that said Letters Patent are hereby corrected as shown below:

In the Heading to the Patent, delete item "[73] ASSIGNEE"

all three lines, and substitute:

--[73] ASSIGNEE    NADELLA
                                RUEIL-MALMAISON, FRANCE
                                Undivided one-half interest--

Signed and sealed this 23rd day of April 1974.

(SEAL)
Attest:

EDWARD M. FLETCHER, JR.                C. MARSHALL DANN
Attesting Officer                       Commissioner of Patents